(12) United States Patent
Kalmbach et al.

(10) Patent No.: US 7,399,022 B2
(45) Date of Patent: Jul. 15, 2008

(54) VEHICLE REAR DOOR

(75) Inventors: Karl-Heinz Kalmbach, Freiburg (DE); Timo Schwarz, Lahr (DE)

(73) Assignee: Peguform GmbH, Botzingen (DE)

( * ) Notice: Subject to any disclaimer, the term of this patent is extended or adjusted under 35 U.S.C. 154(b) by 238 days.

(21) Appl. No.: 11/188,457

(22) Filed: Jul. 25, 2005

(65) Prior Publication Data

US 2006/0022486 A1 Feb. 2, 2006

(30) Foreign Application Priority Data

Jul. 28, 2004 (DE) .................. 20 2004 011 851 U

(51) Int. Cl.
*B60J 5/10* (2006.01)
(52) U.S. Cl. ............... 296/146.8; 296/146.5; 296/146.7
(58) Field of Classification Search ............. 296/146.1, 296/146.5–146.9, 50, 56; 49/502
See application file for complete search history.

(56) References Cited

U.S. PATENT DOCUMENTS

| | | | | |
|---|---|---|---|---|
| 4,184,709 A | * | 1/1980 | Kim | 296/219 |
| 4,630,858 A | * | 12/1986 | Bez | 296/146.8 |
| 4,822,098 A | * | 4/1989 | Vogt et al. | 296/146.5 |
| 4,845,894 A | * | 7/1989 | Herringshaw et al. | 49/502 |
| 4,882,842 A | * | 11/1989 | Basson et al. | 29/857 |
| 4,945,682 A | * | 8/1990 | Altman et al. | 49/502 |
| 5,040,334 A | * | 8/1991 | Dossin et al. | 49/502 |
| 5,446,999 A | * | 9/1995 | Inaba et al. | 49/502 |
| 5,449,213 A | * | 9/1995 | Kiley et al. | 296/56 |
| 5,944,373 A | * | 8/1999 | Seksaria et al. | 296/57.1 |
| 5,947,540 A | * | 9/1999 | Pariseau et al. | 296/57.1 |
| 6,019,418 A | * | 2/2000 | Emerling et al. | 296/146.8 |
| 6,053,562 A | * | 4/2000 | Bednarski | 296/146.5 |
| 6,068,327 A | * | 5/2000 | Junginger | 296/146.13 |
| 6,386,618 B1 | * | 5/2002 | Luckow et al. | 296/146.9 |
| 6,629,352 B2 | * | 10/2003 | Seksaria et al. | 29/428 |
| 6,672,642 B1 | * | 1/2004 | Seksaria et al. | 296/50 |
| 6,886,881 B1 | * | 5/2005 | Henderson et al. | 296/146.2 |
| 6,929,308 B2 | * | 8/2005 | Komatsu et al. | 296/146.5 |
| 6,983,978 B2 | * | 1/2006 | Radu et al. | 296/146.7 |

FOREIGN PATENT DOCUMENTS

| | | |
|---|---|---|
| DE | 36 12 294 A1 | 10/1987 |
| EP | 1 129 873 A | 9/2001 |
| JP | 62-122722 | 4/1987 |
| JP | 2000-118238 | 4/2000 |
| JP | 2000-220531 | 8/2002 |

\* cited by examiner

*Primary Examiner*—D. Glenn Dayoan
*Assistant Examiner*—Greg Blankenship
(74) *Attorney, Agent, or Firm*—Henry M. Feiereisen; Ursula B. Day

(57) ABSTRACT

The invention relates to a vehicle rear door, in particular a drop-down door or a revolving door having an inner door member with a metal profile frame glued to it, exterior paneling and a window pane, wherein the inner door member and/or the window pane exclusively constitute a support surface which bears against a gasket on the vehicle body.

22 Claims, 3 Drawing Sheets

VEHICLE REAR DOOR

CROSS-REFERENCES TO RELATED APPLICATIONS

This application claims the priority of German Patent Application Serial No. 20 2004 011 851.3, filed Jul. 28, 2004 pursuant to 35 U.S.C. 119(a)-(d), the subject matter of which is incorporated herein by reference.

FIELD OF THE INVENTION

The present invention relates to a vehicle door and more particularly to vehicle rear door mounted at the vehicle body and where the vehicle rear door is either a drop-down door pivotable in up and down motion or alternatively, a revolving door where the vehicle rear door is pivotable sideways by means of lateral hinges disposed at the door frame.

BACKGROUND OF THE INVENTION

U.S. Pat. No. 6,053,562 discloses a vehicle rear door which is constructed as drop-down door. This prior art door is constructed from a metal frame which rests against the gasket of the vehicle body in sealing manner. The metal frame also comprises a cross strut, which divides the frame into a window portion and a lower door portion. In this known vehicle rear door, the window glass is mounted directly on the metal frame from the outside, while the lower door portion is provided with a plastic member which is mounted from the inside to the frame.

From the U.S. Pat. No. 6,053,562 patent it is further known to attach exterior paneling directly to the frame from the outside. Since the frame constitutes the support surface for support on the vehicle body gasket, the frame is constructed correspondingly wide, thereby adding considerable weight to the vehicle rear door.

Another drawback of the prior art door is the differential heat expansion of the various parts of the door, which cannot be adequately compensated for and thus leads to undesirable shifting of the door parts relative to one another. Furthermore, the assembly of the known rear door is quite costly.

It would therefore be desirable and advantageous to provide an improved vehicle rear door to obviate prior art shortcomings and to provide a vehicle rear door that is easily assembled, of lighter weight and cost efficient.

SUMMARY OF THE INVENTION

According to one aspect of the present invention, the vehicle rear door comprises an interior door member having a support surface for bearing against a gasket on the vehicle body, a frame member constructed from a metal profile, an exterior paneling member associated with the interior door member, and a window pane, wherein the frame member is glued to an exterior surface of the interior door member and wherein at least one of the support surface of the interior door member and a portion of the window pane constitute the entire support surface for bearing against the gasket in a sealing manner.

The present invention resolves prior art problems for example by avoiding bulk, in that the support surface for bearing against the gasket of the vehicle body is located at the interior door member and not at the frame thereby reducing volume in the frame.

It is a further aspect of the invention to provide a vehicle rear door of a composite-type assembly wherein the frame is glued to the surface of the interior door member and wherein the interior door member constitutes the border between a dry zone and a wet zone. In this type of assembly, the interior door member covers the frame in such a way that the frame is entirely covered when viewed from the passenger compartment. The flat surface of the interior door member is provided with only a necessary number of assembly openings as these openings must be separately sealed against the passenger compartment of the vehicle.

When the vehicle rear door is constructed with a frameless window pane as is oftentimes customary in revolving rear doors, then, either the window pane or the interior door member, have a support surface which bears against the body gasket in a sealing manner. In this case, there is no contact between the frame and the body gasket.

Ideally, the support surface for bearing against the body gasket is formed exclusively by the interior door member. However, this can only be realized when the interior door member extends between the window pane and the body gasket. Thereby it is necessary that the interior door member is provided with a suitable recess for the window pane.

Since the interior door member forms the border between the wet area and the dry area, it is advantageous to glue the window pane from the outside to either the interior door member or in a more preferred embodiment to the interior door member and the frame, thereby establishing a sealed connection between the interior door member and the window pane.

It is another feature of the vehicle rear door of the present invention that the exterior panel parts are mechanically connected exclusively to the interior door member. Thereby, any difference in heat expansion between the interior door member and the outer paneling parts can be compensated for in optimal manner.

Advantageously, the interior door member is constructed as a plastic form part which thereby becomes easily adaptable to a variety of vehicle body configurations. When there are only small variations in the shape of the vehicle body, the configuration of the frame need not be changed and only the interior door member needs to be adjusted. Another advantage of the plastic form part is that it permits easy adjustment to any lay-out of the pattern the gasket extends.

It is another advantageous feature of the rear vehicle door of the present invention that the exterior paneling parts are formed from plastic for a modular-type assembly, thus permitting great variety of design configurations. Furthermore, by attaching the outer paneling to the plastic interior door member through mechanical means, the assembly process is greatly simplified since the lacquered outer paneling parts can be mounted to the interior door member after the main assembly process and the gluing step have been completed and after the add-on parts have been installed. The embodiment with the paneling members as plastic form parts also contributes greatly to the overall weight reduction of the vehicle rear door.

Due to the afore-described modular assembly, all types of electrical connections, including antenna connections or similar are easily attached to the interior door member and then covered by the exterior paneling.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
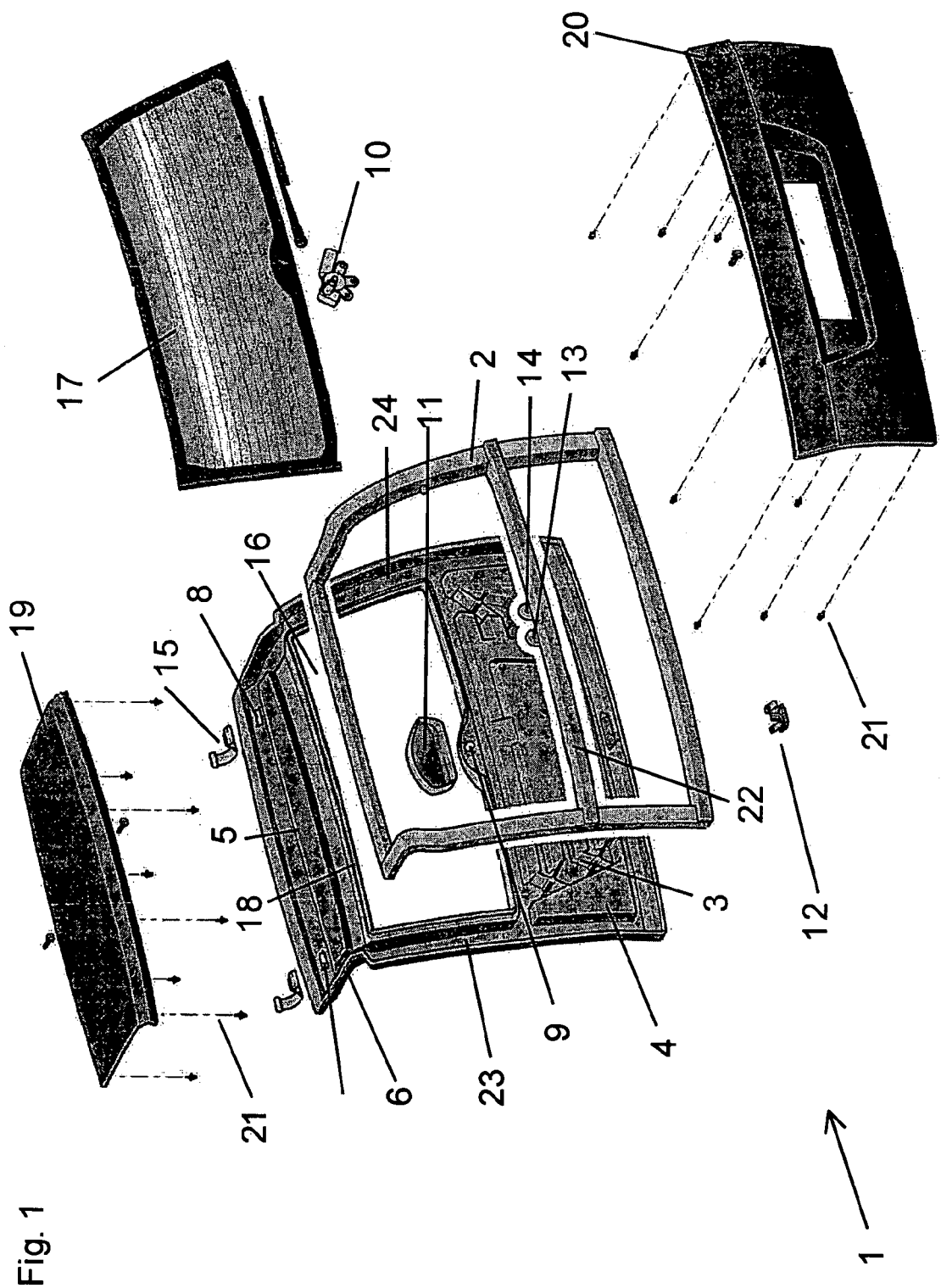
FIG. 1 is an exploded view of a drop-down vehicle rear door according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a drop-down vehicle rear door 1, which is essentially constructed from a metal profile frame 2, wherein the frame 2 is glued on to an interior door member 3. The interior door member 3 is constructed as a plastic form part.

The interior door member 3 is constructed as a unitary one-piece having essentially two flat surfaces, a lower portion surface 4 and an upper portion surface 5 connected to each other by connecting surfaces 23, 24. Frame 2 is completely covered by the interior door member 3 as viewed from the passenger compartment of the vehicle.

Figure 3:
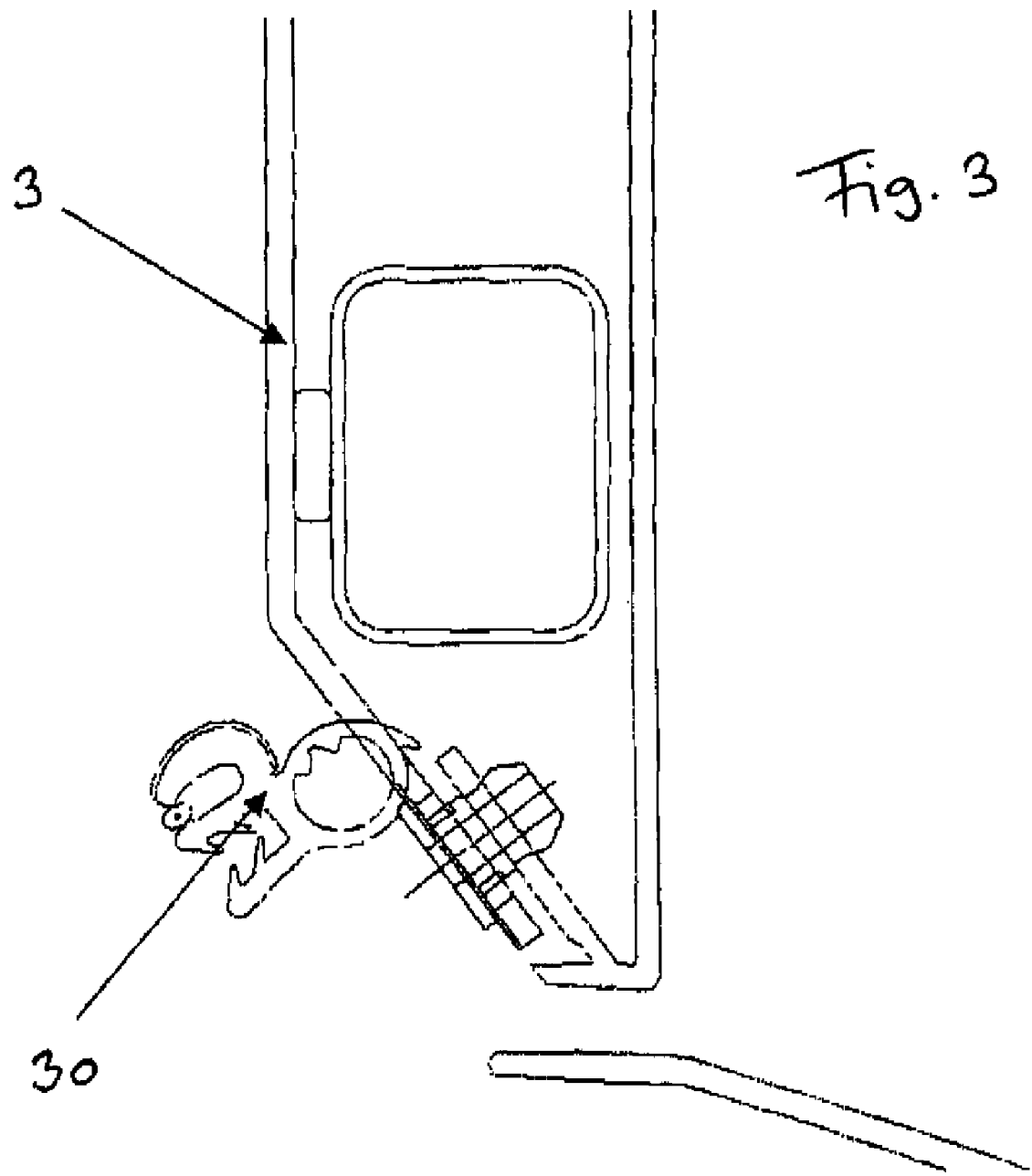
FIG. 3 is a cross section showing interior door member 3 and the gasket.

In the embodiment as shown in FIG. 1, a portion of the interior door member 3 forms the sole support surface 6 for bearing against a vehicle body gasket 30 (FIG. 3). Frame 2 does not contact the vehicle body gasket 30 at all. Frame 2 is reinforced with a cross strut 22, which is likewise entirely covered by the interior door member 3 as viewed from the passenger compartment.

The interior door member 3 forms the border between the wet- and dry-area and therefore acts as seal relative to the passenger compartment.

The interior door member 3 has a trough-shaped construction for fittingly surrounding side surfaces of the frame 2.

The flat surface of the interior door member 3 is provided with assembly openings 7, 8, 9, whereby the drive axle of a windshield wiper motor 10 projects through the opening 9. Since the opening 9 is located in the part of the interior door member 3 oriented toward the passenger compartment, opening 9 is covered from the interior of the vehicle by means of a rubber socket in a sealing manner (not shown here). For the sake of pictorial clarity, additional assembly openings are not shown in the drawings. Part 11 represents a portion of the interior paneling, which is connected only with the interior door member 3.

All add-on assembly parts, such as the windshield wiper motor 10 or a lock 12 are attached to the load bearing frame 2. For attachment of the windshield wiper motor 10, two adjacent brackets 13, 14 are provided at frame 2.

Hinges 15 project through assembly openings 7, 8. It is not necessary to seal assembly openings 7, 8 since they are located outside the support surface 6, that is, they are not associated with the interior of the vehicle body.

Interior door member 3 is provided with an opening 16 to be covered by of window pane 17 attached to the interior door member 3. A rim 18 constitutes a slightly elevated circumferential edge. The window pane 17 is glued from the outside onto rim 18 and to the adjacent frame 2. It also suffices to glue the window pane only to interior door member 3.

Two exterior paneling parts 19, 20 are provided for covering the vehicle rear door. These parts 19, 20 are exclusively attached to the interior door member 3 by means of clamps 21 made from plastic.

During assembly of the parts of the vehicle rear door according to the present invention, first the interior door member 3 is glued together with frame 2. Then, the window pane 17 is glued to interior part 3 and frame 2. After this assembly step, the add-on parts such as cable strand, electrical components, antennas, hinges, windshield wiper motor, lock, lock latch, ball pivot for the gas pressure springs as well as the third braking light are installed. After pre-assembly of the exterior paneling parts 19, 20, they are mechanically connected directly to the interior door member 3 by means of the clamping mechanisms 21. Damaged paneling parts can be easily replaced by removable panels 19, 20 made form plastic. Due to this ease of exchange, the repair costs are kept low thus, also leading to a favorable insurance class.

Figure 2:
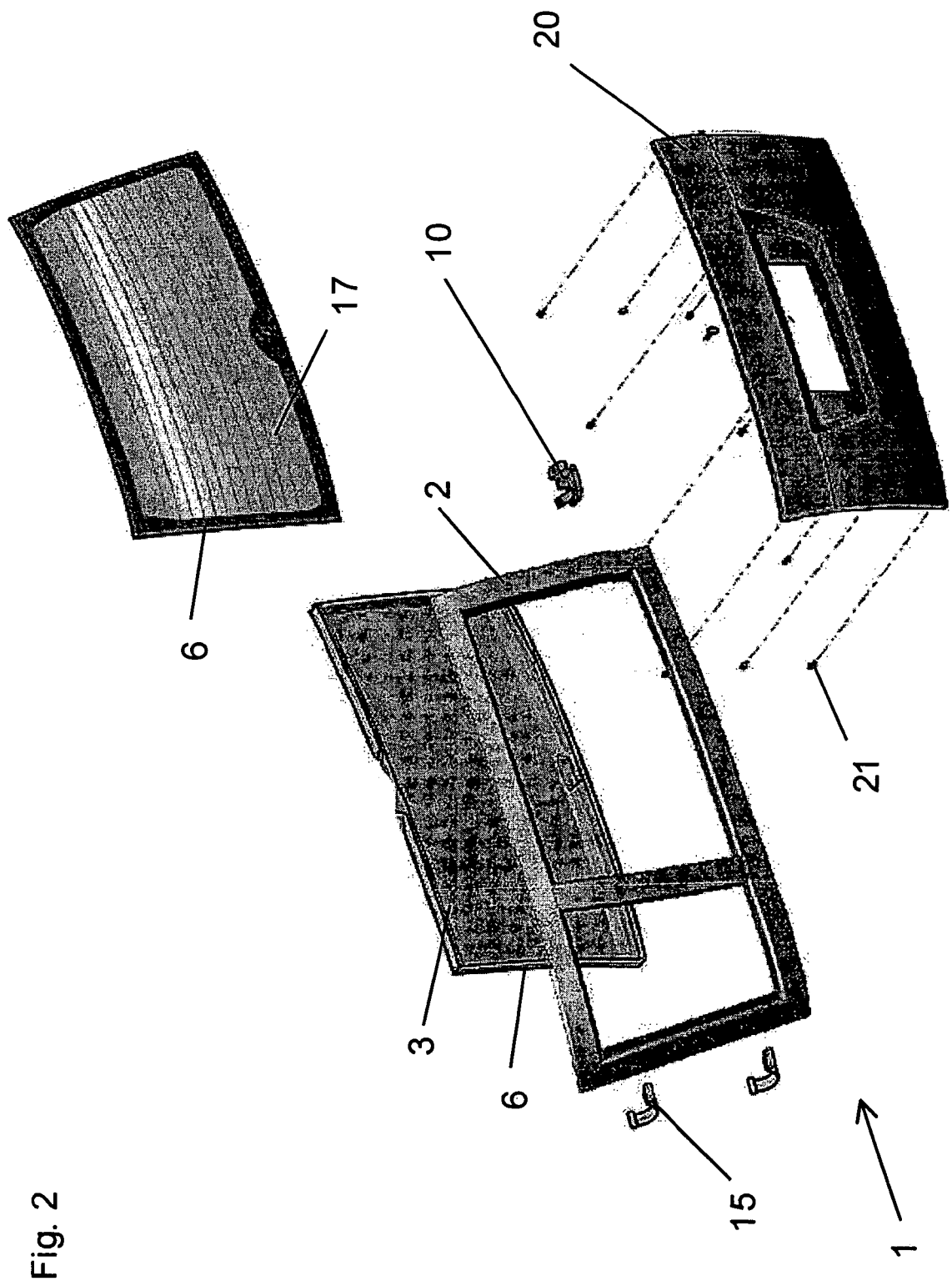
FIG. 2 is an exploded view of revolving vehicle rear door.

Shown In FIG. 2 is a vehicle rear door 1 constructed as a revolving door. Same or corresponding elements are indicated by same reference numerals as in FIG. 1.

The revolving rear door 1 has a frame 2 and an interior door member 3. The interior door member 3 has a flat surface and forms the surface 6 bearing against a vehicle body gasket (FIG. 3). The frame 2 as connected to the interior door member 3 is entirely covered as viewed from the passenger compartment. It is understood that should the frame 2 project beyond the area of the bearing surface 6, then that portion is of course not covered by the interior door member 3. As in FIG. 1, the interior door member 3 of the embodiment shown in FIG. 2 represents the border between wet- and dry-areas. Assembly openings are not shown here. As seen in FIG. 2, the window pane 17 is constructed as a frameless pane. With this type of construction, the support surface 6 is not exclusively formed by the interior door member 3 but additionally also by the rim area 18 of the window pane 17. In the shown embodiment, the window pane 17 is attached to the frame 3 by means of a plug-in type flange.

The hinges 15 are also attached to the frame 2 as shown in the embodiment in FIG. 1. An exterior paneling part 20 is directly fastened to the interior door member 3 by means of the clamp mechanism 21. In the embodiment as shown in FIG. 2, it is however necessary to additionally fasten the exterior paneling part 20 at the upper portion of frame 2. In the shown vehicle rear door 1, the interior door member 3 bears from the back against the window pane 17 in a sealing manner thereby realizing the function of the interior door member 3 as the border between the wet- and dry-areas. It is understood that an additional gasket can be placed between the interior door member 3 and window pane 17.

While the invention has been illustrated and described as embodied in a vehicle rear door, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. The vehicle rear door assembly comprising:
an interior door member,
a metal profile frame member,
a sealing gasket connected to a rear portion of the vehicle body, and
a window pane, wherein the frame member is glued to an exterior side of the interior door member and wherein at least one of, the interior door member and a portion of the window pane have a support surface for bearing against the gasket in a sealing manner, and wherein the said support surface constitutes the entire support surface bearing against the gasket, wherein the interior door member, at least in some areas thereof has a trough-like configuration for receiving the frame therein and wherein side surfaces of the frame are surrounded by the interior door member.

2. The vehicle rear door of claim 1, wherein the frame is glued to the exterior side of the interior door member and entirely covered by the interior door member as viewed from a passenger compartment of the vehicle at least in the area within the support surface.

3. The vehicle door of claim 1, wherein the interior door member is formed from plastic.

4. The vehicle door of claim 1, wherein the interior door member is constructed as a unitary one-piece member.

5. The vehicle door of claim 1, wherein the interior door member is constructed having a flat surface and is functioning as a border between wet area and a dry area of the vehicle.

6. The vehicle door of claim 1, wherein the interior member is provided with one or more assembly openings.

7. The vehicle door of claim 6, wherein the assembly openings occupy an area which is less than the entire surface of the interior member.

8. The vehicle door of claim 7, wherein a percentage portion of a combined area of all assembly openings at the surface of the interior member is less than about 20%.

9. The vehicle door of claim 8, wherein the area is less than about 10%.

10. The vehicle door of claim 6, wherein the assembly openings at least within a passenger compartment are covered by opening coverings.

11. The vehicle door of claim 1, wherein the interior door member is provided with an opening for placement of the window pane.

12. The vehicle door of claim 1, wherein the window pane is mounted exteriorly to the vehicle door and glued to the interior door member and the frame.

13. The vehicle door of claim 1, further comprising additional assembly parts which are attached to the frame.

14. The vehicle of claim 1, wherein only the interior door member exclusively forms the support surface for bearing on the body gasket.

15. The vehicle of claim 1, wherein the interior door member is provided with a grip handle formed with the interior door member in a unitary one-piece.

16. The vehicle of claim 1, wherein the interior door member is formed from a fiberglass reinforced polypropylene matrix.

17. The vehicle door of claim 1, wherein a wall thickness of the interior member is 2 mm to 4 mm.

18. The vehicle door of claim 17, wherein the thickness is 3 mm.

19. The vehicle door of claim 1, wherein a glue bead is provided between the frame and the interior door member, and wherein the thickness of the glue bead is between 2 mm and 6 mm.

20. The vehicle door of claim 19, wherein the thickness is 4 mm.

21. The vehicle rear door assembly comprising:
an interior door member,
a metal profile frame member,
a sealing gasket connected to a rear portion of the vehicle body, and
a window pane, wherein the frame member is glued to an exterior side of the interior door member and wherein at least one of, the interior door member and a portion of the window pane have a support surface for bearing against the gasket in a sealing manner, and wherein the said support surface constitutes the entire support surface bearing against the gasket, wherein the exterior paneling member is fixed exclusively on the interior door member, and wherein the paneling member is attached by means of one or more clamps.

22. The vehicle rear door assembly comprising:
an interior door member,
a metal profile frame member,
a sealing gasket connected to a rear portion of the vehicle body, and
a window pane, wherein the frame member is glued to an exterior side of the interior door member and wherein at least one of, the interior door member and a portion of the window pane have a support surface for bearing against the gasket in a sealing manner, and wherein the said support surface constitutes the entire support surface bearing against the gasket, wherein an exterior paneling member is fixed exclusively on the interior door member.

* * * * *